Figure 3:
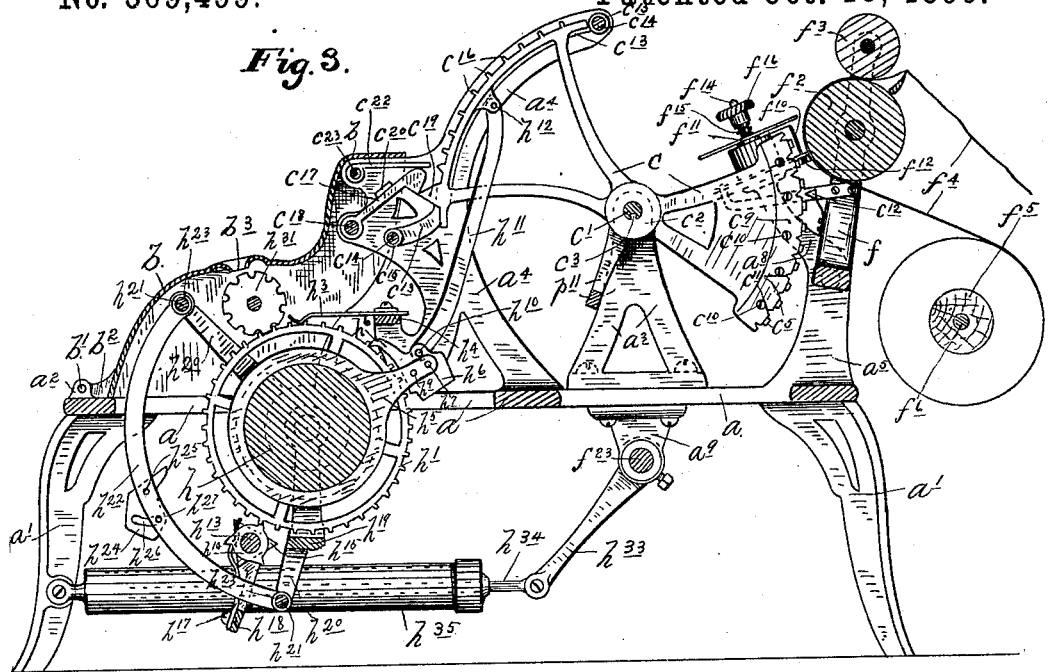

(No Model.) 8 Sheets—Sheet 1.
H. H. JOHNSON, C. O. WHITE & M. B. LLOYD.
LISTING AND COMPUTING MACHINE.
No. 569,499. Patented Oct. 13, 1896.
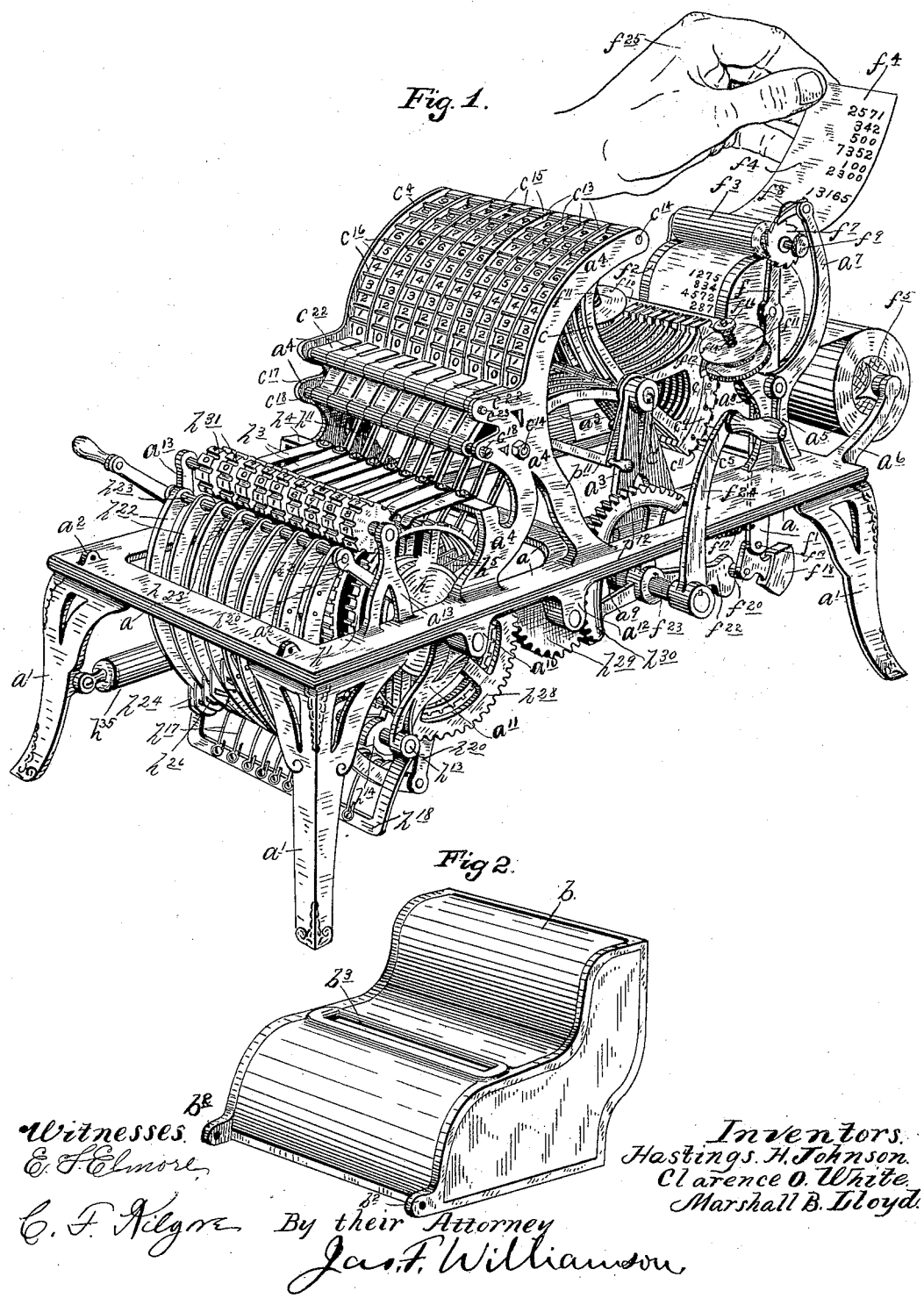
Witnesses
E. F. Elmore
C. F. Kilgore
Inventors
Hastings H. Johnson
Clarence O. White
Marshall B. Lloyd
By their Attorney
Jas. F. Williamson (No Model.) 8 Sheets—Sheet 2.

H. H. JOHNSON, C. O. WHITE & M. B. LLOYD.
LISTING AND COMPUTING MACHINE.

No. 569,499. Patented Oct. 13, 1896.

Witnesses.
E. F. Elmore
C. F. Kilgore

Inventors.
Hastings H. Johnson.
Clarence O. White.
Marshall B. Lloyd.

By their Attorney
Jas. F. Williamson.

(No Model.) 8 Sheets—Sheet 3.

H. H. JOHNSON, C. O. WHITE & M. B. LLOYD.
LISTING AND COMPUTING MACHINE.

No. 569,499. Patented Oct. 13, 1896.

Witnesses
E. F. Elmore,
C. F. Kilgore, By their Attorney
Jas. F. Williamson

Inventors.
Hastings H. Johnson.
Clarence O. White.
Marshall B. Lloyd.

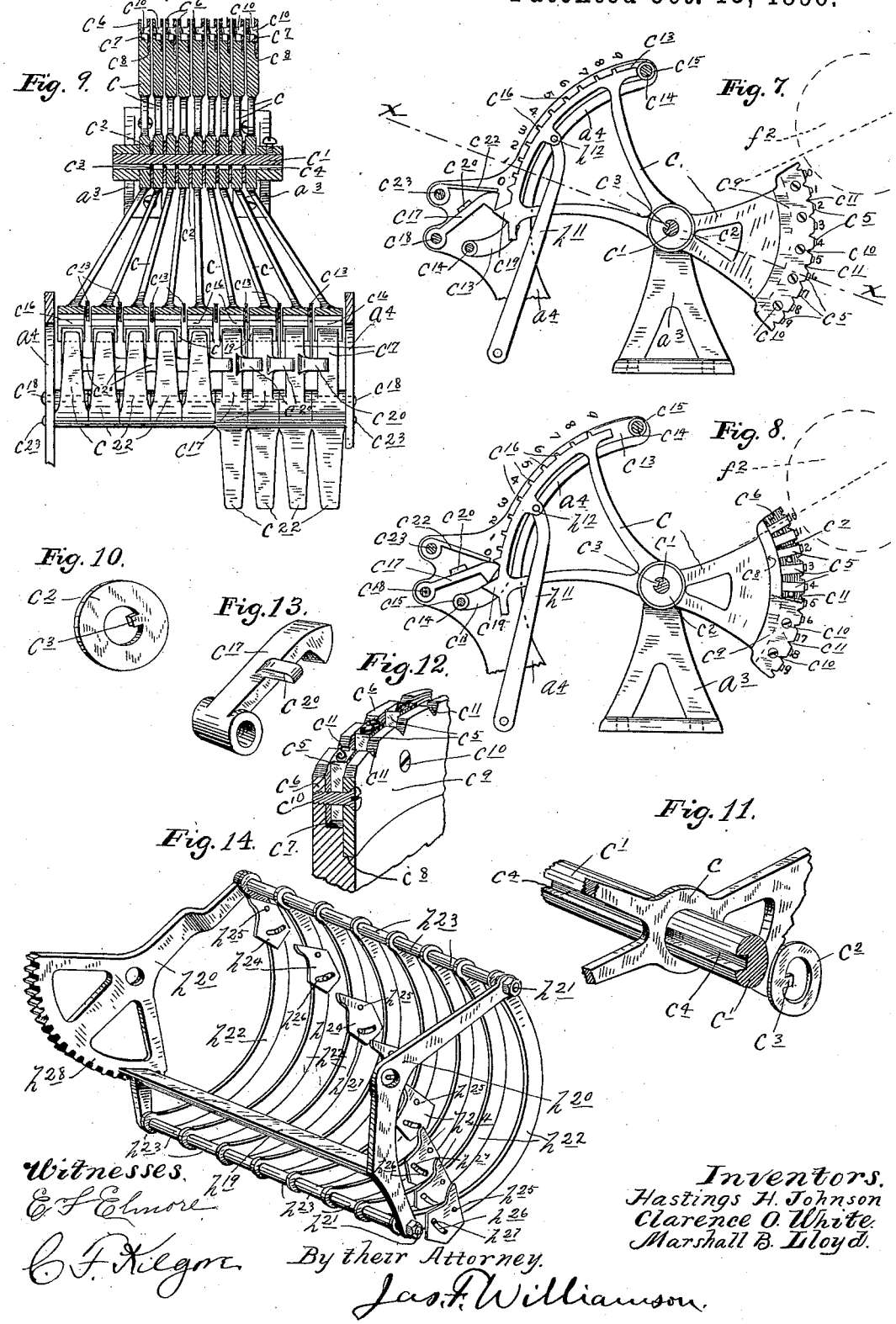

(No Model.) 8 Sheets—Sheet 5.
H. H. JOHNSON, C. O. WHITE & M. B. LLOYD.
LISTING AND COMPUTING MACHINE.
No. 569,499. Patented Oct. 13, 1896.
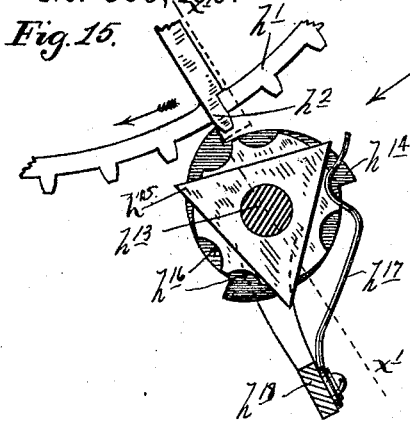
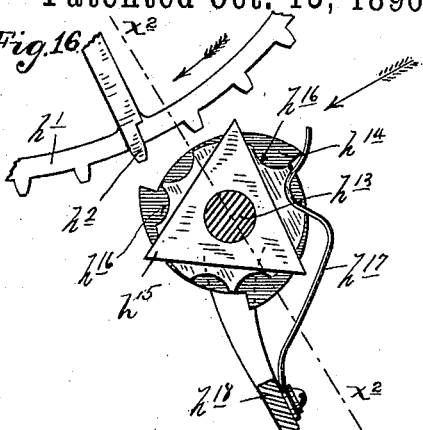
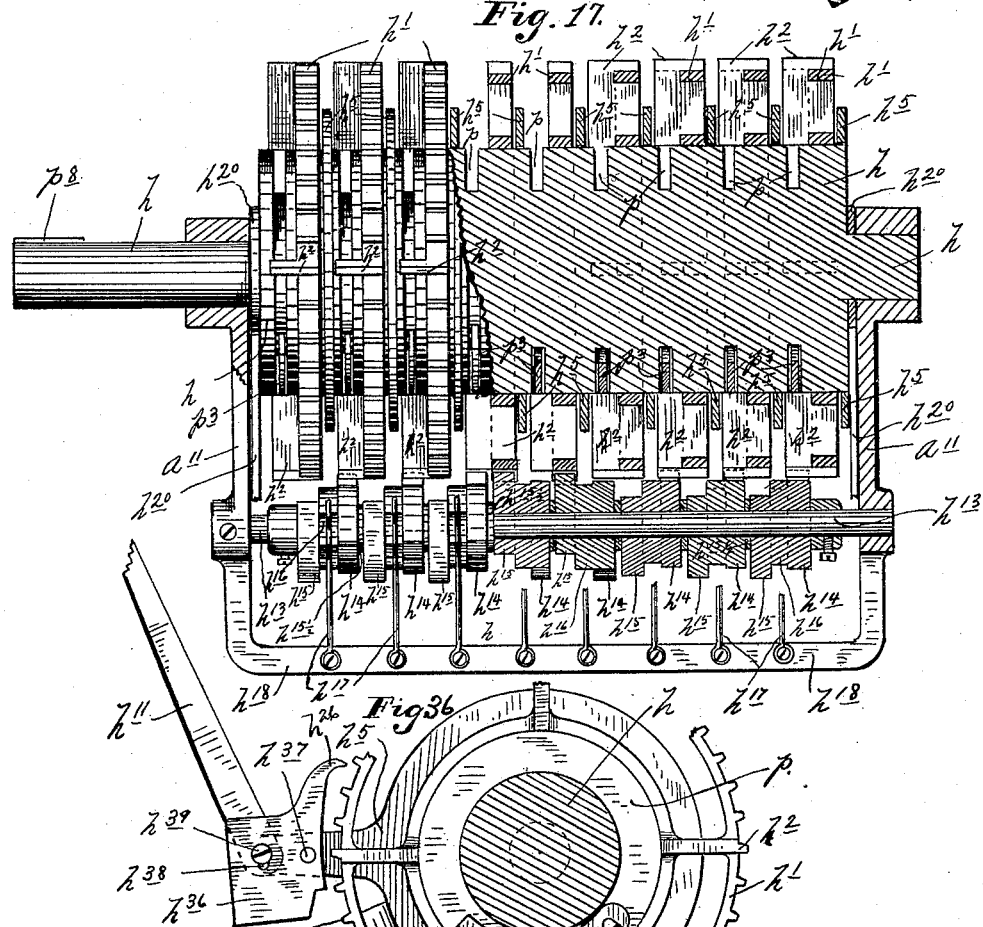
Witnesses.
E. F. Elmore
C. F. Kilgore
Inventors.
Hastings H. Johnson
Clarence O. White
Marshall B. Lloyd
By their Attorney.
Jas. F. Williamson (No Model.) 8 Sheets—Sheet 6.
H. H. JOHNSON, C. O. WHITE & M. B. LLOYD.
LISTING AND COMPUTING MACHINE.
No. 569,499. Patented Oct. 13, 1896.
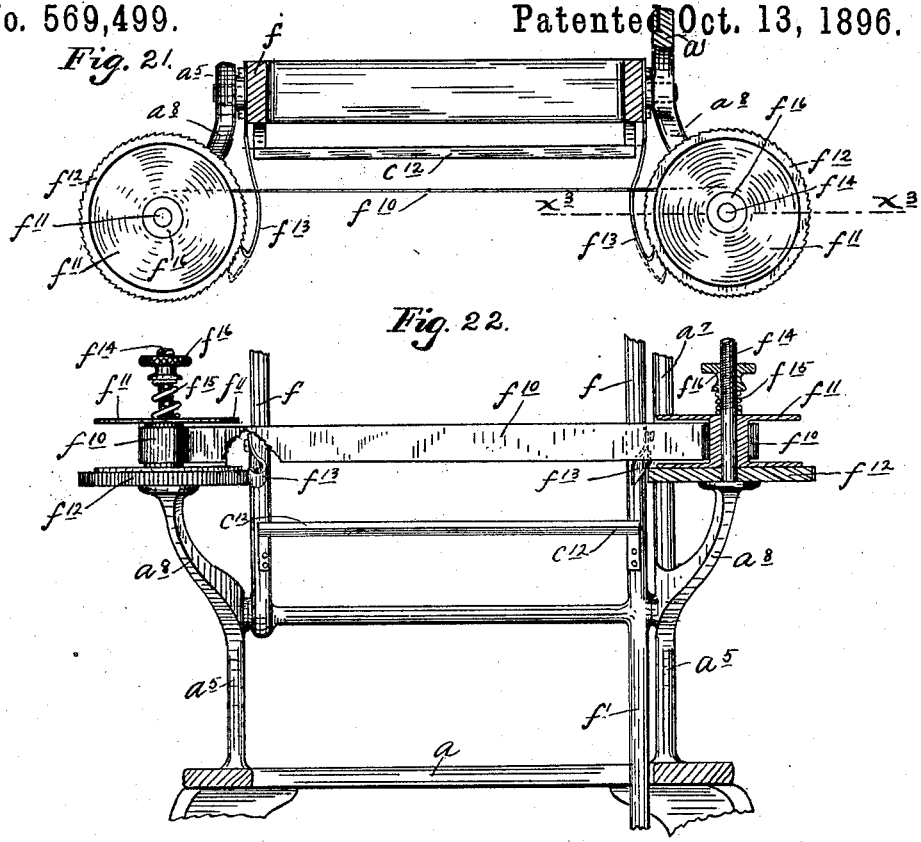
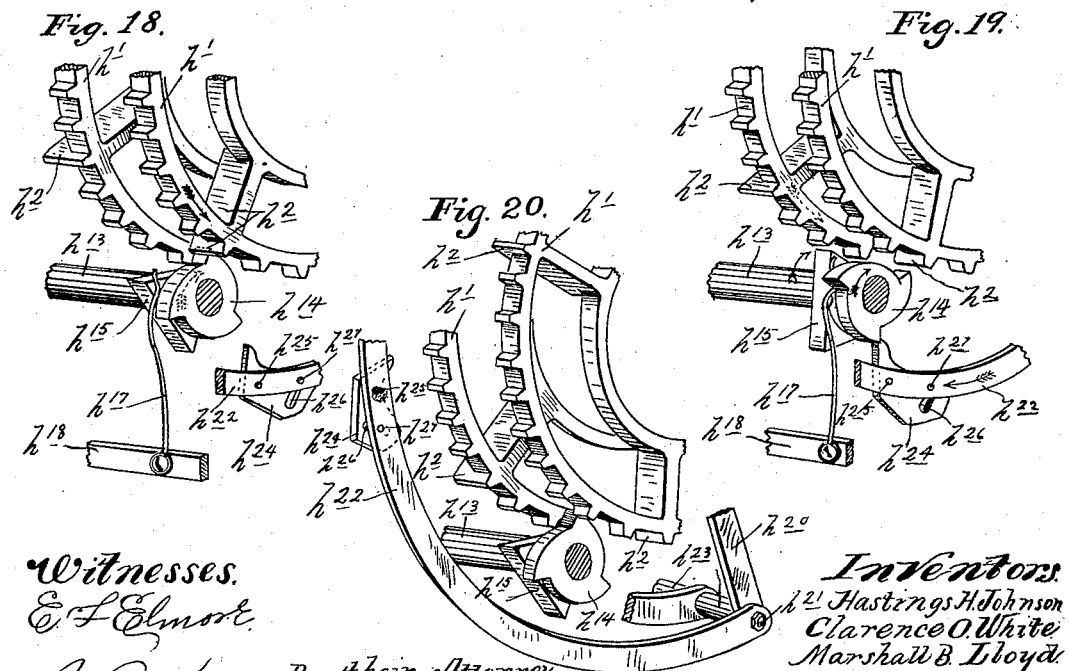
Witnesses.
E. F. Elmore
C. F. Kilgore
Inventors.
Hastings H. Johnson
Clarence O. White
Marshall B. Lloyd
By their Attorney.
Jas. F. Williamson.

(No Model.) 8 Sheets—Sheet 7.

H. H. JOHNSON, C. O. WHITE & M. B. LLOYD.
LISTING AND COMPUTING MACHINE.

No. 569,499. Patented Oct. 13, 1896.

Witnesses
E. F. Elmore
C. T. Kegri

Inventors
Hastings H. Johnson
Clarence O. White
Marshall B. Lloyd.

By their Attorney
Jas. F. Williamson (No Model.) 8 Sheets—Sheet 8.
H. H. JOHNSON, C. O. WHITE & M. B. LLOYD.
LISTING AND COMPUTING MACHINE.
No. 569,499. Patented Oct. 13, 1896.
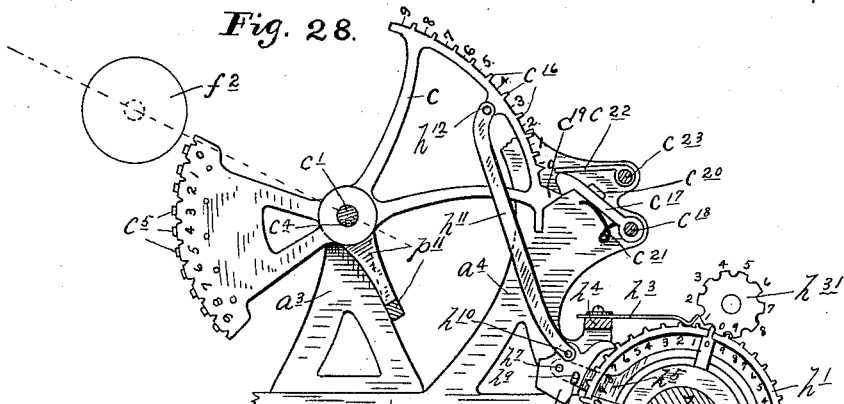
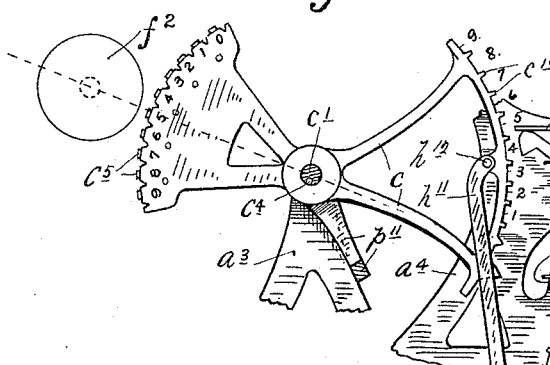
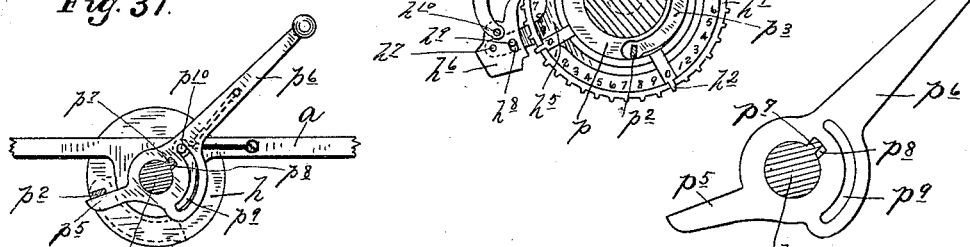
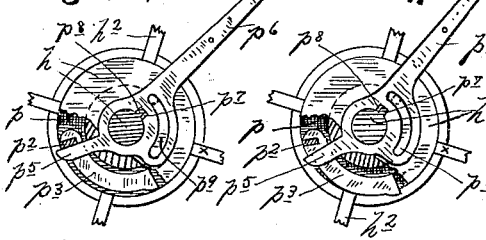
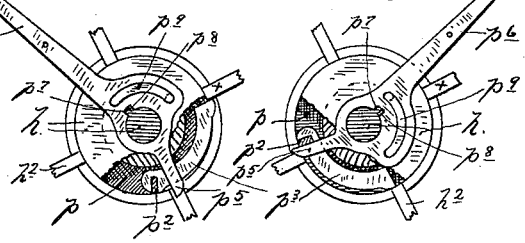
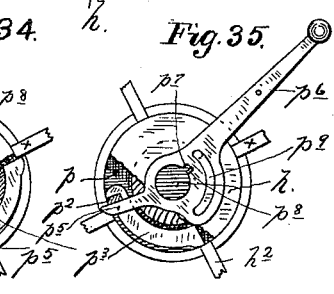
Witnesses.
E. F. Elmore
C. F. Aclyne
Inventors.
Hastings H. Johnson.
Clarence O. White.
Marshall B. Lloyd.
By their Attorney.
Jas. F. Williamson.

UNITED STATES PATENT OFFICE.

HASTINGS H. JOHNSON, CLARENCE O. WHITE, AND MARSHALL B. LLOYD, OF MINNEAPOLIS, MINNESOTA; SAID JOHNSON AND LLOYD ASSIGNORS, BY DIRECT AND MESNE ASSIGNMENTS, TO SAID JOHNSON AND WHITE.

LISTING AND COMPUTING MACHINE.

SPECIFICATION forming part of Letters Patent No. 569,499, dated October 13, 1896.

Application filed October 7, 1895. Serial No. 564,886. (No model.)

*To all whom it may concern:*

Be it known that we, HASTINGS H. JOHNSON, CLARENCE O. WHITE, and MARSHALL B. LLOYD, citizens of the United States, residing at Minneapolis, in the county of Hennepin and State of Minnesota, have invented certain new and useful Improvements in Listing and Computing Machines; and we do hereby declare the following to be a full, clear, and exact description of the invention, such as will enable others skilled in the art to which it appertains to make and use the same.

Our invention has for its object to provide a reliable listing and computing machine of simple and cheap construction.

To this end our invention consists of the novel devices and combinations of devices hereinafter described, and defined in the claims.

Our invention is illustrated in the accompanying drawings, wherein the same letters refer to like parts throughout the several views, and directions will be taken from the position of an observer facing the front end of the machine.

Figure 4:
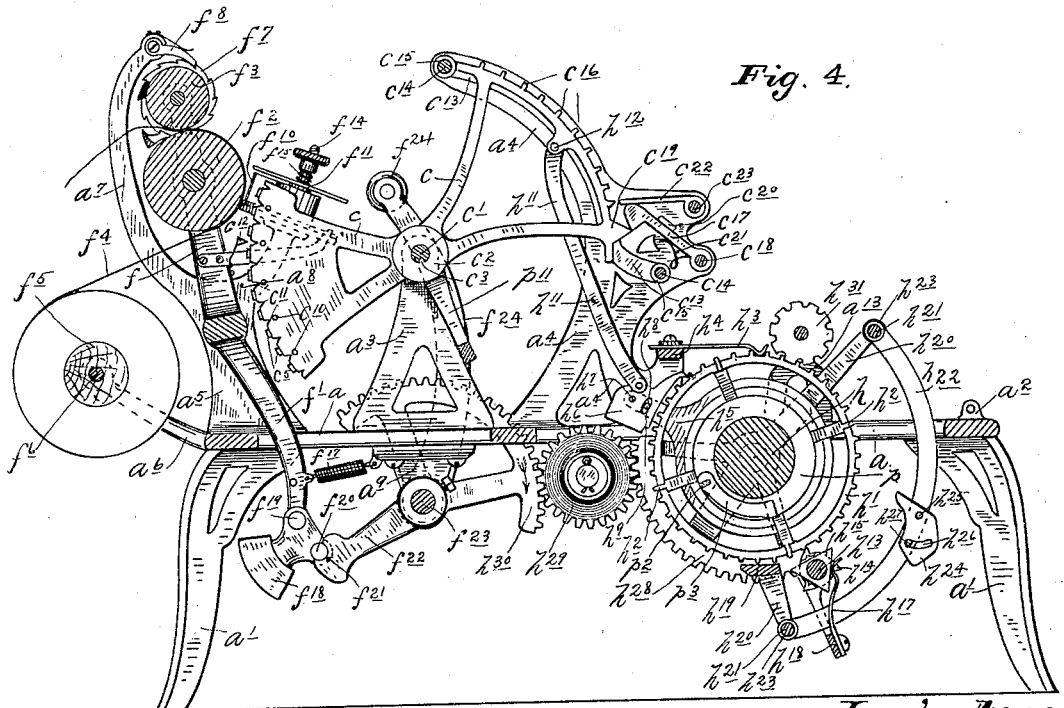
Figure 5:
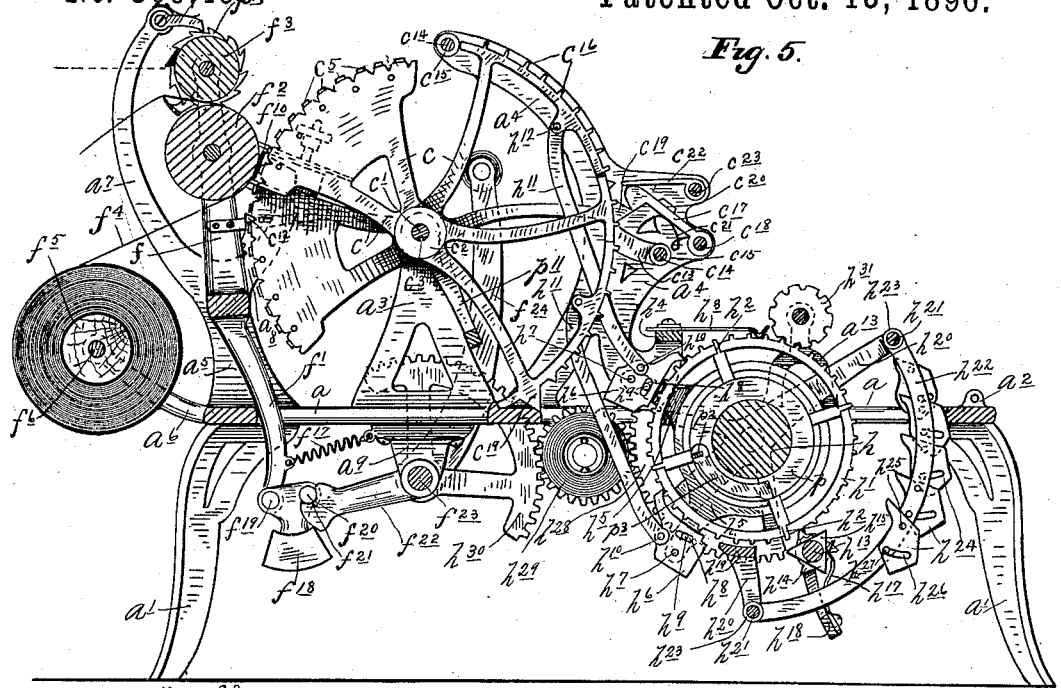
Figure 6:
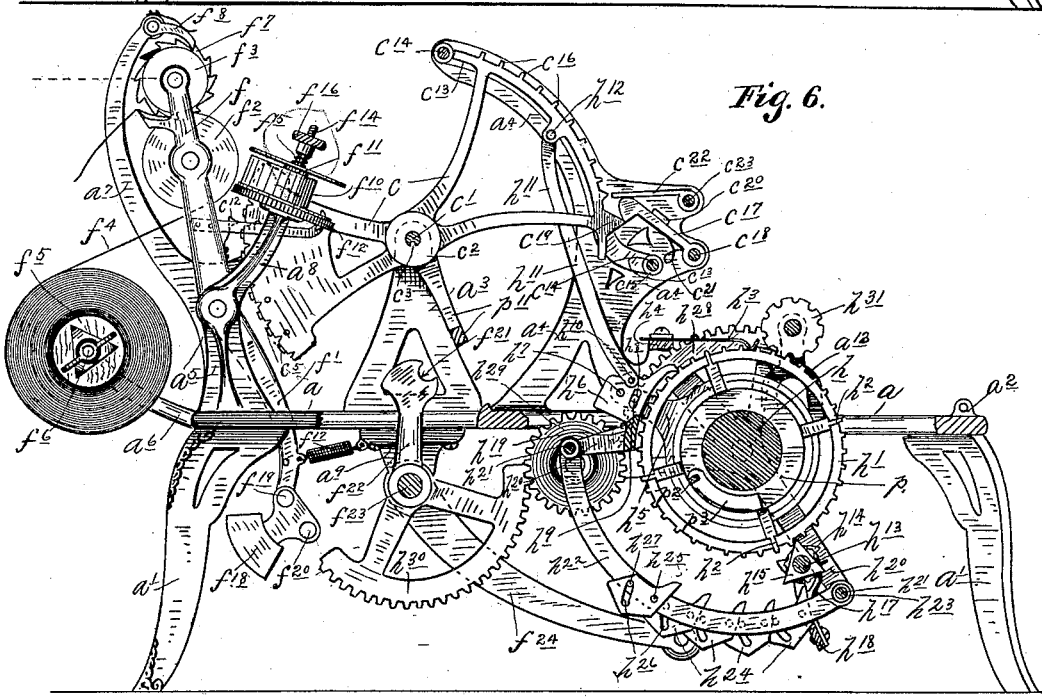
Figure 23:
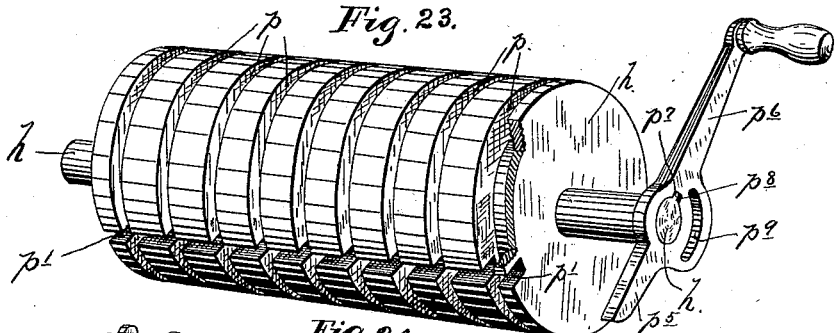
Figure 24:
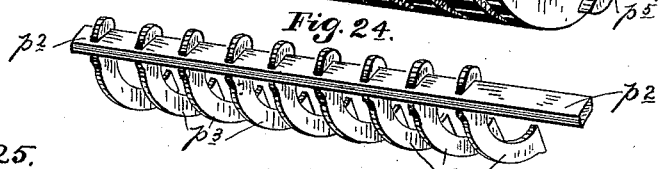
Figure 25:
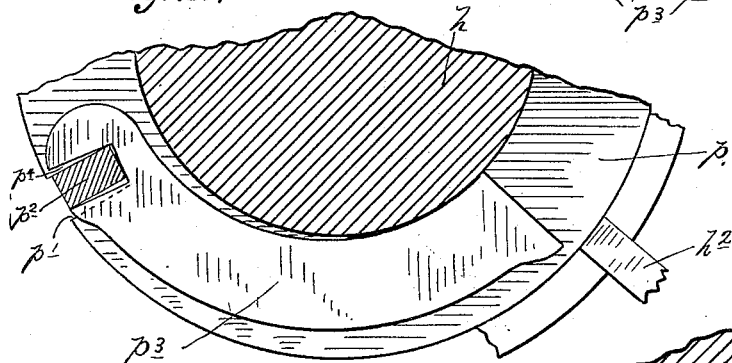
Figure 26:
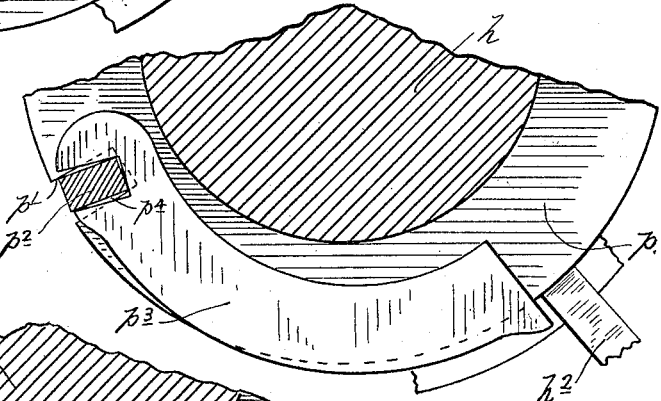
Figure 27:
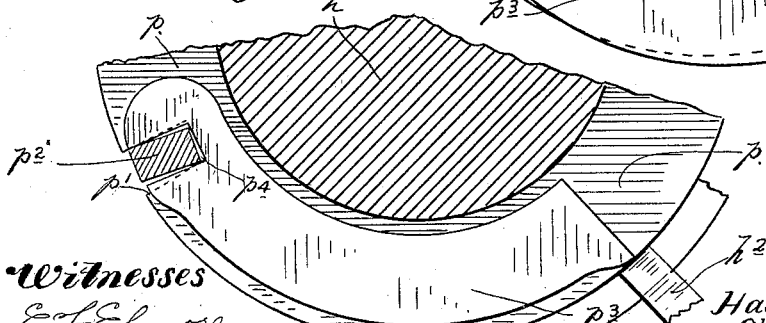

Figure 1 is a perspective view of the machine with the counter-cover removed and all the parts in their idle or normal position. Fig. 2 is a perspective view of the counter-cover detached. Fig. 3 is a central longitudinal vertical section through the machine as shown in Fig. 1, looking from the right toward the left, with all the parts in their normal position. Fig. 4 is a similar view on the same line with the parts in the same position, but looking from the left toward the right. Fig. 5 is a view similar to Fig. 4 with the parts as they would appear when in the act of making the impression or at the first step of the listing-lever's movement. Fig. 6 is a view similar to Figs. 4 and 5 with the parts as they appear at the end of the down or primary stroke of the listing-lever or after a number has been listed, the counters have been moved to add the units of the listed number, the carriers have been set for the tens, and the combined type and key levers have been returned to their normal position, but before the tens of the listed number have been carried onto the counters to complete the addition. Fig. 7 is a detail in side elevation, showing the double-sector combined type and key levers in their normal position as related to the stop-board and the printing or impression roller, which is shown in diagram lines only. Fig. 8 is a similar view of the same parts after the combined type and key levers have been moved one step or as required to bring the cipher-type to the printing-point. Fig. 9 is a section on the line $x\ x$ of Fig. 7, looking from above, with the type removed from the type-sectors and with some of the finger-guards thrown back to expose the stops of the stop-board. Fig. 10 is a detail in perspective, showing one of the spacing-washers which separate the sector-levers. Fig. 11 is a detail in perspective, showing a part of one of the sector-levers, a part of the shaft for the same, and one of the spacing-washers pulled apart from the shaft. Fig. 12 is a detail in perspective, showing a part of one of the type-sectors with the type in position. Fig. 13 is a detail in perspective, showing one of the stops or dogs of the stop-board. Fig. 14 is a perspective view showing the cradle-like rack with cross-bar for operating the counter-actuating dogs and staggered gravity-dogs for operating the carriers. Figs. 15 and 16 are details in left side elevation, showing the relation of any given units-counter to the tens-carrier, which is set thereby, the said Fig. 15 showing the counter as ready to operate or set the carrier, and the said Fig. 16 showing the said parts after the said counter has moved or set the tens-carrier in position for action later on the counter of the next higher order. Fig. 17 is a detail of the counters and the carriers and the supporting-shafts, partly in plan view and partly in section, part of the section being on the line $x'\ x'$ of Fig. 15 and a part on the line $x^2\ x^2$ of Fig. 16, looking in direction of the arrows. In the said Fig. 17 the first three counters and carriers toward the right are shown on the irregular line $x'\ x'$ of Fig. 15. The next two counters and carriers are shown on the line $x^2\ x^2$ of Fig. 16, and the left-hand three of the said counters and carriers are shown in plan view as they would appear when the parts are in the position shown in Fig. 15. Figs. 18, 19, and 20 are details in perspective, showing parts of a pair of adjacent counters as related to a coöperating tens-carrier and the carrier-operating dog on the cradle-like rack in three different positions for illustrating the action thereof in adding or carrying forward the tens. Said Fig. 18 shows one of the counters as about to set a carrier. Said Fig. 19 shows the same parts after the carrier has been set, and said Fig. 20 shows the same parts after the carrier has been made by the rack to move the counter of the next higher order, so as to add or carry the tens. Fig. 21 is a detail, partly in plan view and partly in horizontal section, for showing the inking-ribbon feed devices and the final alining-bar as related to the platen or printing-rocker. Fig. 22 is a front elevation of the same parts shown in Fig. 21 with some portions broken away and others shown in section on the line $x^3$ $x^3$ of Fig. 21. Fig. 23 is a detail in perspective, showing the shaft on which the counters are mounted detached. Fig. 24 is a perspective showing the devices for returning the counters to zero detached from the shaft shown in Fig. 23. Figs. 25, 26, and 27 are details in section for showing the action of the parts shown in Figs. 23 and 24. Figs. 28, 29, and $29^a$ are details in left side elevation, showing the relation of the sector-levers, units-counters, and the connections between the two for causing the return movements of the counters to operate the sector-levers and aline the proper type for printing the total of the listed numbers. Fig. 30 is a detail in left side elevation, showing the relation of the counter-returning crank-handle to the key and key-way which connects the same with the counter-supporting shaft. Fig. 31 is a detail in left side elevation, showing the counter-supporting shaft and its crank-handle in relation to each other and the frame when the said parts are in their normal position. Figs. 32, 33, 34, and 35 are details, chiefly in left side elevation, but partly in section, with some portions broken away, for illustrating the action of the counter-returning devices in returning the counters to their normal position ready for starting a new list; and Fig. 36 is a detail, partly in left side elevation and partly in section, illustrating a modification in the construction and arrangement of the counter-actuating dogs and the devices for returning the counters to their normal or starting position without thereby setting the sector-levers for printing the total.

In the detailed description about to be given the parts will be specified not necessarily in the order of their operation, but in the order thought to be most conducive to clearness and brevity of statement. The following classification of reference-letters will also be observed: $a$ and its powers, $a'$ $a^2$, &c., will be used for the parts of the main frame; $b$ and its powers, &c., for the cover; $c$ and its powers for the type selecting and alining devices; $f$ and its powers for the impression devices; $h$ and its powers for the counting devices proper; $p$ and its powers for the counter-returning devices.

*Frame and cover.*—The main frame may be of any suitable design which is adapted to support the working parts of the machine. The said frame is shown as composed of a rectangular oblong skeleton bed $a$, supported by legs $a'$ and provided with various projecting and depending brackets or rigid parts $a^2$ $a^3$, &c., adapted to serve as bearings or other supports for the working parts of the machine. The cover $b$ (shown in Fig. 2) is intended to cover only a part of the mechanism and is applied to the main frame, as shown in Fig. 3, being hinged thereto by bolts or rivets $b'$, connecting the lugs $b^2$ of the cover with lugs $a^2$ on the machine-bed $a$. The said cover $b$ is provided with a reading-slot $b^3$, directly over the reading-counters of the machine and adapted to expose to the sight of the operator the total or aggregate sum of the listed numbers after each stage of the listing action, as will hereinafter more fully appear.

*The listing mechanism.* (See Figs. 1 to 13, 21, and 22.)—The listing mechanism involves, of course, suitable type selecting and alining devices and suitable impression mechanism for coöperation therewith.

*Type selecting and alining devices.* (See Figs. 1 to 13.)—Considering, first, the type selecting and aligning mechanism, a series of double-sector combined type and key levers $c$ are set abreast of each other on a common shaft $c'$, which is fixed in the pedestals $a^5$. The said levers $c$ are loosely pivoted on the shaft $c'$ and are spaced apart from each other by washers $c^2$, having tongues or key-pieces $c^3$, which engage in a common longitudinal groove or key-seat $c^4$ in the said shaft $c'$, as best shown in Figs. 7 to 11. This construction permits the independent pivotal movement of any one of the said sector-levers $c$ without moving any of the other levers by frictional contact. The rear sector of the said levers $c$ is equipped with type $c^5$, and the forward sector of the said lever $c$ is marked with corresponding key-notations arranged in reverse order to the type $c^5$. In virtue of this construction and arrangement it is obvious that any movement imparted to the key-sector will produce a corresponding reverse movement of the type-sector, and that by bringing any key-notation of the key-sector to a predetermined stopping-point the corresponding type may also be brought to a predetermined stopping-point or printing position.

As shown, the sector-levers $c$ are in number equal to the number of denominations or orders of the decimal scale, for which listing provision is made. The type-sectors of said levers $c$ are equipped with the number-type ("0" to "9") required for each denomination, and the key-sectors are marked with corresponding key-notations ("0" to "9") in the reverse order. As shown, the cipher-type occupies the highest type position on the type-sector, and the cipher-notation occupies the lowest notation position on the key-sector. Hence the first step of down movement on any key-sector will aline the corresponding cipher-type in the printing-line, and by additional steps of downward movement of the key-sectors any desired corresponding digit-number type ("1" to "9") on the type-sectors may be brought to the printing-point.

The type used are common printer's type with their feet cut off, so as to render the same of the proper length for this machine. For removably holding the said type $c^5$ the type-sector is constructed as shown in Fig. 12, by reference to which view it will be seen that the type-sector head has a fixed flange or rim $c^6$, a pair of shoulders $c^7$ $c^8$, and a removable clamping flange or rim $c^9$, resting on the shoulder $c^8$. The type $c^5$ rest on the shoulder $c^7$ and are clamped between the flanges $c^6$ and $c^9$ by screws $c^{10}$ working between the type $c^5$. This construction renders cheap type available and renewable at will. The type-sector flanges $c^6$ and $c^9$ are also provided with transverse V-shaped notches $c^{11}$ between the type $c^5$, as best shown in said Fig. 12, for coöperation with a final-alining bar $c^{12}$ (best shown in Figs. 3 to 6, 21, and 22) to insure the exact or final alinement of the selected type, as will hereinafter more fully appear. The key-sectors of all of the said levers $c$ are separated by dividers or partitions $c^{13}$, as best shown in Figs. 1 to 8, which partitions are supported on cross-rods $c^{14}$, connecting the brackets $a^4$, rising from the bed $a$. The said partitions $c^{13}$ are suitably spaced apart from each other by spacing-washers $c^{15}$ on the said rods $c^{14}$. The said dividers or partitions $c^{13}$ serve to prevent the fingers from overlapping from one sector to another, and thereby insure the independent movement of the sector-levers in the fingering action. The said partitions $c^{13}$ in practice will be marked with different colors, so as to more readily distinguish the different columns or decimal-scale orders to the eye of the operator. The upper members of the cross-rods $c^{14}$ serve also to limit the return movement of the type-sectors, as shown in Figs. 3, 4, 5, 6, 7, and 9. The key-sectors are also provided on their faces with cross-lugs $c^{16}$ or equivalent raised or depressed surfaces, dividing the key-notations from each other, serving as fingering-surfaces for the operator and as stop-surfaces for coöperation with a stop-board composed of a series of movable stop-dogs $c^{17}$ to positively limit the downward movement of the sectors. The said dogs $c^{17}$ are pivoted on a common cross-rod $c^{18}$, supported by the brackets $a^4$, and the free ends of the same normally stand in position for coöperation with a series of projecting cam-lugs $c^{19}$, projecting outward from the lower ends of the series of key-sectors. The said dogs $c^{17}$ are provided with lateral projections $c^{20}$, arranged each to overlap the next adjacent dog lower down in the decimal scale or toward the right, as best shown in Figs. 9 and 13. The right-hand dog or member lowest in the decimal scale is subject to the action of an underlying spring $c^{21}$, as shown in Figs. 4, 5, and 6, which is operative, in virtue of the overlapping projections $c^{20}$, to hold up the whole bank of stop-dogs $c^{17}$ in their normal position, and thereby relieve the cam-lugs $c^{19}$ and the key-sectors from the weight of the dogs $c^{17}$. Said overlapping projections $c^{20}$ connect all the dogs $c^{17}$ of the bank in such a way that whenever any dog $c^{17}$ of a higher order is operated the dogs $c^{17}$ of all the lower orders in the decimal scale or toward the right will be collectively operated, and this collective action of the dogs $c^{17}$ on the key-sector cam-lugs $c^{19}$ will throw down said key-sectors one step, thereby automatically alining all the cipher-type of the said lower orders at the printing-point or line of assembly. Hence it is only necessary to finger the sectors for digits or significant numbers. All the cipher-type will be automatically assembled.

Directly over the bank of stop-dogs $c^{17}$ is located a corresponding bank of finger-guards $c^{22}$, pivoted on a common rod $c^{23}$, held by the brackets $a^4$. These finger-guards $c^{22}$ serve simply to prevent pinching of the fingers between the ends of the stop-dogs $c^{17}$ and the fingering-lugs $c^{16}$ on the key-sectors at the times when the sectors are being intercepted by the stops $c^{17}$ in the fingering action.

The top of the cover $b$ overlies the stop-board, extending toward but stopping short of the sectors, as shown in Fig. 3. Hence the top of the cover serves as a hand-rest for the operator in the fingering action on the key-sectors. Under the coöperation of the double-sector levers $c$, the pivoted dogs $c^{17}$, and finger-guards $c^{22}$, above described, it is obvious that the operator can assemble the required type for listing any desired number by simply pulling down the key-sectors for the digits or significant numbers ("1" to "9") until the dogs $c^{17}$ intercept the fingered sectors. In this action of the stop-board the selected type will be approximately alined. The final alinement is effected by the coöperation of the type-sector notches $c^{11}$ and the alinement-bar $c^{12}$ in advance of the impression at the initial forward movement of the impression-platen or printing-rocker, as will hereinafter more fully appear.

Type-assembling errors may be readily corrected before printing or counting by simply resetting the one or more wrongly-set key-sectors.

*The impression devices.* (See Figs. 1 to 8 and 21 and 22.)—The said final-alinement bar $c^{12}$ is spring-supported from the upper arms $f$ of a frame $f f'$, pivoted to the pedestals $a^5$, as best shown in Figs. 1 to 6 and in Fig. 22, and which frame carries the impression-roller $f^2$ and the feed-roller $f^3$. This frame $f f'$ may therefore, for convenience of distinction, be called the "platen" or "printing-rocker." The strip of paper or other impression material $f^4$ is unwound from a spool $f^5$, which is removably mounted on a cross rod or shaft $f^6$, fixed to the arms $a^6$, projecting upward and rearward from the machine-bed $a$. The shaft $f^6$ is adapted to be removed endwise from its bearings to permit the removal of the spool $f^5$. The said strip $f^4$ is passed under and over the impression-roller $f^2$ and under the feed-roller $f^3$. The feed-roller $f^3$ is provided at one end with a fixed ratchet-wheel $f^7$, with which coöperates a spring-pressed pawl $f^8$ on a fixed arm $a^7$, rising from one of the pedestals $a^5$, to impart feed motion to the paper strip $f^4$ under the rocking motion of the printing-rocker $f f'$. The feed-roller has a finger-button $f^9$ for moving the same by hand.

In proper position between the type-sectors of the levers $c$ and the impression-roller $f$ is an inking-ribbon $f^{10}$, the ends of which are fixed to spools $f^{11}$, as best shown in Figs. 21 and 22. The spools $f^{11}$ rest on ratchet feed-disks $f^{12}$, which receive motion in opposite directions from spring-pawls $f^{13}$, projecting forward from the upper arms $f$ of the printing-rocker $f f'$. The ratchet-disks $f^{12}$ and the spools $f^{11}$ are mounted on common spindles $f^{14}$, fixed to arms $a^8$, rising from the pedestals $a^5$. The spindles $f^{14}$, above the spools $f^{11}$, are screw-threaded, and on the same are mounted springs $f^{15}$ and thumb-nuts $f^{16}$, by which the spools $f^{11}$ may be yieldingly clamped to the disks $f^{12}$ or be set free therefrom at will. By rendering one of the spools $f^{11}$ fast to its underlying disk $f^{12}$ and rendering the other spool loose from its underlying disk $f^{12}$ either spool may be made to turn with its feed-disk $f^{12}$, while the other will turn on and contrary to its feed-disk $f^{12}$. Hence the inking-ribbon $f^9$ may be made to travel in either direction, according to which spool $f^{11}$ is made fast and which loose on the respective feed-disks $f^{12}$.

The depending lever-arm $f'$ of the printing-rocker $f f'$ is connected by a spring $f^{17}$ to the machine-bed forward of the rocker, which spring tends to hold the printing-rocker $f f'$ to its rearmost limit away from the type-sectors. The rocker-lever $f'$ has thereto attached at its lower end a weighted arm or gravity-piece $f^{18}$. The arm $f^{18}$ connects with the lever $f'$ by pivot-pin $f^{19}$ and is provided with a lateral stud or lug $f^{20}$. The lug $f^{20}$ is adapted to engage with a notch $f^{21}$ in the rear end of an arm $f^{22}$, which is rigid on the hand-shaft $f^{23}$. The shaft $f^{23}$ is mounted in the bearing-lugs $a^9$, depending from the bed $a$, and is provided at its right end with a crank-handle or operating-lever $f^{24}$. The arms $f^{18}$ and $f^{22}$ constitute a knuckle-joint or toggle-lever, the arms of which will engage at the initial part of the hand-shaft's movement and until their engaging parts $f^{20} f^{21}$ have passed the dead-center. The pivoted arm $f^{18}$ will then drop by gravity and allow the rigid arm $f^{22}$ to pass onward with the shaft $f^{23}$. This arrangement of the knuckle-joint arms $f^{18}$ and $f^{22}$ enables the printing-rocker $f f'$ to be thrown forward against the assembled type long enough to take the impression at the initial part of the downward or primary stroke of the crank-handle or main operating-lever $f^{24}$. As quick as the knuckle-joint arms $f^{18}$ and $f^{22}$ separate the retracting-spring $f^{17}$ restores the rocker $f f'$ to its normal position.

The main hand-lever $f^{24}$, on its downward or primary stroke, also returns the sector-levers $c$ to their normal position, and has further additional functions, both on its primary or downward stroke and on its return or upward stroke, through means which will be presently described as a part of the computing mechanism.

With the devices so far described it is obvious that any desired numbers may be listed in succession on the paper strip $f^4$. Several such numbers are shown so listed on the strip $f^4$ as held up by the hand $f^{25}$ in Fig. 1 of the drawings.

Supposing the total or aggregate of the listed numbers to have been predetermined, it could also be listed in the same manner by the mechanism so far described. We have shown means, however, for listing the total number automatically by the machine upon the return of the counters to their normal or starting position, as will hereinafter appear from the description of the computing mechanism.

*Computing mechanism.*—The computing mechanism involves counting devices proper for coöperation with the above-described listing mechanism to count or add the listed numbers in succession and counter-returning devices for restoring the counters to their normal or starting position ready for a new list.

*The counting devices proper.* (See Figs. 1 to 20.)—In bearings $a^{10}$, forward of the brackets $a^4$, is mounted a shaft $h$, of large diameter, which supports a decimal-scale series of counters $h'$, arranged in the same order as the combined type and key levers $c$, hitherto described. As shown, the counters $h'$ are made relatively large for a purpose which will hereinafter appear, and have teeth which are in number some multiple of the ten numbers ("0" to "9") required for each denomination or order. As shown, the counters $h'$ have forty teeth, and every tenth tooth $h^2$ of said counters is a broad-faced tooth, for purposes which will presently and more fully appear. A bank of spring-pawls $h^3$ projects forward from a cross-bar $h^4$, supported by the brackets $a^4$, and operate to hold the counters $h'$ in whatever position they may be set.

On the shaft $h$, intermediate of the counters $h'$, is pivoted a corresponding series of dog-carrying arms $h^5$, to the outer or rear ends of which is pivoted a series of counter-actuating dogs $h^6$. The said dogs $h^6$ are pivoted to the arms $h^5$ at the points $h^7$, and are provided with slots $h^8$, which are engaged by lateral pins or studs $h^9$ on the arms $h^5$, which slot-and-pin connections $h^8$ $h^9$ serve to limit the pivotal movement of the dogs $h^6$ on the arms $h^5$. At points $h^{10}$, forward of their pivot-pins $h^7$, the dogs $h^6$ are pivotally connected to links $h^{11}$, extending to the key-sectors of the combined type and key levers $c$ and pivotally connected thereto at the points $h^{12}$. The counters $h'$ are arranged for counting movement from the right toward the left with respect to Fig. 1. When the parts are all in their normal position, as shown in Figs. 3 and 4, the tips of the dogs $h^6$ are free to move downward over the teeth of the counters $h'$, and will be so moved downward several steps, corresponding to the movement of the key-sectors caused by the operator in selecting and assembling the type for the numbers to be listed. Otherwise stated, the dogs $h^6$ will be set, under the fingering action on the key-sectors, in position to engage with the proper tooth of the counters $h'$ for moving the said counters $h'$, later, to add the units in each denomination of the listed number. One of the said dogs $h^6$ is shown as so set in Fig. 5 of the drawings. Any dog $h^6$ may be reset for correcting errors.

Directly in front of the counters $h'$ and below the same is located a shaft $h^{13}$, mounted in bearing-arms $a^{11}$, projecting from the bed-plate $a$. On said shaft $h^{13}$ is mounted a series of carriers for the tens in each denomination, composed each of a tumbler $h^{14}$ and a triangle or star-wheel $h^{15}$, as best shown in Figs. 15 to 20. The said carriers $h^{14}$ $h^{15}$ are suitably spaced apart, so as to insure independent action, by spacing-washers $h^{15¼}$ on the shaft $h^{13}$.

The tumbler portion $h^{14}$ and the star-wheel portion $h^{15}$ of each carrier are on a common hub, but suitably spaced apart, so as to bring the tumbler $h^{14}$ in radial line with a given counter $h'$ and the star-wheel $h^{15}$ in radial line with the counter of the next higher order. The hubs of the said carriers are provided with two stop-surfaces $h^{16}$ for each star point, with which surfaces $h^{16}$ engage the free ends of spring-pawls $h^{17}$ for holding the carriers wherever set. The pawls $h^{17}$ are secured to a common yoke-bar $h^{18}$, supported by the fixed arms $a^{11}$, depending from the bed $a$. The carriers $h^{14}$ $h^{15}$ are so related to the counters $h'$ that whenever the tens are reached in any denomination or order the broad-faced tooth $h^2$ of the corresponding counter $h'$ will engage the tumbler $h^{14}$ and move the same forward one step, from the position shown, for example, in Fig. 18 into the position shown in Fig. 19, thereby bringing one point of the star-wheel $h^{15}$ into position for engagement later with the counter $h'$ of the next higher order. The above anticipated action of the counters and tens-carriers cannot take place until the set of counter-actuating dogs $h^6$ has been moved upward. Said dogs $h^6$ are so moved, in succession or as they happen to stand set, by means of a bevel-edged cross-bar $h^{19}$, forming part of a cradle-like rack, (marked with the letters $h^{19}$ to $h^{28}$ and shown detached in Fig. 14 and in working positions in Figs. 1, 3, 4, 5, and 6.) The end pieces $h^{20}$ of said cradle are further connected by upper and lower end cross-rods $h^{21}$, which support longitudinal arched bars $h^{22}$, spaced apart by washers $h^{23}$ on said rods. Gravity-dogs $h^{24}$ are pivoted to said arched bars $h^{22}$ by pins $h^{25}$ and provided with slots $h^{26}$, engaged by lateral studs $h^{27}$ on said bars $h^{22}$ for limiting their pivotal movements. The right-hand end piece $h^{20}$ of the cradle is provided with a sector-gear $h^{28}$. The said gravity-dogs $h^{24}$ on said cradle are staggered in respect to each other for successive action on the carriers $h^{14}$ $h^{15}$ in the order of the decimal scale, as will presently more fully appear. The said cradle-like rack, above described, is pivoted loosely on the trunnions of the counter-supporting shaft $h$, and an idle or intermediate gear $h^{29}$, mounted in a bearing $a^{12}$, connects the cradle sector-gear $h^{28}$ with a sector-gear $h^{30}$ on the hand-shaft $f^{23}$. Hence when the main hand-lever $f^{24}$ is pulled forward and downward for its primary stroke the cradle-like rack will be moved rearward and upward, and vice versa on the return stroke of said main hand-lever. The said cradle normally stands as shown in Figs. 1, 3, and 4. At the initial part of the said cradle's downward and rearward movement the said cross-bar $h^{19}$ thereon will engage with the counter-actuating dogs $h^6$ and move the said dogs and the counters $h'$ together throughout the remainder of the rearward and upward movement of the cradle or the primary stroke of the hand-lever $f^{24}$. The upward movement of the counter-actuating dogs $h^6$ will, through the links $h^7$, also carry upward the key-sectors, thereby restoring the combined type and key levers $c$ to their normal positions. These actions may be readily understood by an inspection and comparison of Figs. 5 and 6. In said Fig. 5 one of the dogs $h^6$ is shown as having been set by the fingering of the key-sectors in proper position for engagement with the counters $h'$, and the cradle has started on its rearward and upward movement with the bar $h^{19}$ about to engage with the said dogs. In said Fig. 6 all the said parts are shown as they appear at the end of the rearward and upward stroke of the cradle.

The dogs $h^6$ have beveled heels and the bar $h^{19}$ is reversely beveled, so that when the said bar meets the heels of the dogs the said parts will engage with a camming action, which will have the effect to lock the tips of the dogs between the engaged teeth of the counters $h'$. This prevents the counters $h'$ from being thrown past their proper stopping position under the effect of momentum. Hence an accurate movement of the said counters is insured. On this rearward and upward stroke of the cradle the said counters $h'$ are therefore moved forward for counting or adding the proper number of units in each denomination of the listed number, and the broad teeth $h^2$ of the said counters $h'$ will also operate on the tumblers $h^{14}$ of the carriers or as many thereof as necessary, so as to turn the said carriers from the position shown in Fig. 18 to the position shown in Fig. 19 and set the wheels $h^{15}$ in proper position to operate later on the counters of the next higher orders and carry forward the tens.

The staggered dogs $h^{24}$ on the arch-bars $h^{22}$ of the cradle are so hung and shaped that under the rearward and upward movement of the cradle they will either clear the carriers entirely or freely rock on their pivots to pass by the same without any effect on the said carriers; but on the return stroke of the primary lever $f^{24}$ or the forward and upward movement of the cradle the tips of the said staggered dogs $h^{24}$ will engage with such of the carriers as may have been previously set by the counters and will turn the same one step or from the position shown in Fig. 19 to the position shown in Fig. 20, thereby properly moving the counters of the next higher orders to carry forward or add in the tens. In this way the totals resulting from the addition of the last-listed number to the previously-listed numbers will always be counted onto the counters $h'$ and might, if the said counters were marked with the proper notations, be read directly therefrom. For convenience, however, the primary counters $h'$ are made to engage and operate secondary or reading counters $h^{31}$, which are loosely mounted on a common shaft $h^{32}$ above the primary counters and supported by the pedestals $a^{13}$, rising from the machine-bed $a$. The said reading-counters $h^{31}$ have ten teeth and are marked with notation-numbers "0" to "9," as required, in each denomination. The primary counters $h'$ have teeth to some multiple number of the reading-counters for the purpose of rendering the reading-counters of the requisite size for the action of the dogs $h^6$ in a limited arc of the same. As shown, the said counters $h'$ have forty teeth, as hitherto noted. Hence each quadrant of the counters $h'$ has ten teeth, which represents, of course, the denomination or order numbers ("0" to "9") corresponding to the teeth of the reading-counters. The reading-counters $h^{31}$ will therefore be given a complete revolution by every quadrant of the primary counters $h'$, and any movement of the primary counters $h'$ will produce a corresponding movement of the reading-counters $h^{31}$ and bring the proper numbers under the reading-slot $b^3$ of the cover or into the total-line in the proper order for the decimal-scale notation.

Inasmuch as the teeth of the reading-counters $h^{31}$ always engage with the teeth of the primary counters $h'$ and the latter are held by the spring-lock pawls $h^3$, the reading-counters will also be held wherever set and are free for independent action without requiring intermediate spacing-washers on the supporting-shaft $h^{32}$.

The tens-carriers $h^{14}$ $h^{15}$ must be carefully designed so as to bear the proper relation to each other and to the primary counters $h'$ in order to insure the proper action of the said parts. The star-wheel $h^{15}$ must not interfere with the forward movement of any counter $h'$ when the said counter is moved by the dogs $h^6$ to count up the units in that denomination, and nevertheless the said star-wheel $h^{15}$ must be capable of being set in advance by the counter of the lower order to act later on the counter of the next higher order. By giving to the tumblers $h^{14}$ three shoulders and the star-wheels $h^{15}$ three points and providing two stop-surfaces $h^{16}$ for each point of the star this result is insured. With said construction the star-wheel $h^{15}$ will be held by the spring-lock pawl $h^{17}$ either in the position shown in Fig. 15 or in the position shown in Fig. 16. In both cases clearance will be afforded for the movement of any counter $h'$ which is in radial line with the star-wheel $h^{15}$ without interference from the star-wheel. The broad tooth $h^2$ of the counter of the next lower order can then operate on the tumbler $h^{14}$, as shown in Figs. 15 and 18, to move the carrier into the position shown in Figs. 16 and 19. Then on the return stroke of the cradle-like rack the gravity-dog $h^{24}$ can operate on the tumbler $h^{14}$, as it is shown about to do in Fig. 19, and move the carrier through one hundred and twenty degrees or one-third of a revolution, thereby bringing the parts into the position shown in Fig. 20, which, so far as the star and tumbler are concerned, is the same as shown in Figs. 15 and 18.

The left end of the hand-shaft $f^{23}$ is provided with a crank-arm $h^{33}$, the lower end of which is connected to the outer end of a piston $h^{34}$, which works within a cylinder $h^{35}$, pivoted to one of the front end frame-legs, as best shown in Figs. 1 and 3. The said piston $h^{34}$ and cylinder $h^{35}$ are of any proper well-known construction to coöperate as a dash-pot, and the said dash-pot thus provided serves to cushion the return stroke of the main operating-lever $f^{24}$ and the cradle-like rack which is operated thereby. This prevents violent or sudden action of the staggered dogs $h^{24}$ of the cradle on the tumblers $h^{14}$ of the carriers. If not thus cushioned, the said dogs $h^{24}$ might move the carriers more than one step under a quick action of the operating-lever. Such action, however, is largely and probably sufficiently guarded against by making the shaft $h$ of large diameter, so as to give large bearings for the counters $h'$. This gives so much friction between the counters $h'$ and their bearings that the action of the dogs $h^{24}$, carried by the rack, would not be liable to throw the carriers more than one step, because the carriers thus moved by said dogs $h^{24}$ would have also to move the counters $h'$ in radial line with the set star-wheels of the carriers.

The staggered relation of the said cradle-dogs $h^{24}$ in the order of the decimal scale, or from the right toward the left, is vital to the proper action of the machine. Thereby the said dogs $h^{24}$ of the cradle are made to act on the set of carriers in succession in the order of the decimal scale or from the right toward the left, and this successive action is essential in order to carry forward the tens in the proper way to secure a correct total. This is so because adding the tens to any counters may require further movement of the counters of the next higher orders besides that for which the carriers were set in the primary counting or adding movement. The said staggered arrangement of the said dogs $h^{24}$ secures this result, because any given dog may operate its carrier and cause the counter $h'$, moved thereby, to move the carrier of the next higher order, if necessary, before the dog $h^{24}$ of the next higher order can operate thereon. Otherwise stated, the said staggered arrangement of the said dogs $h^{24}$ permits the coöperative action of the carriers on the counters and the counters on the carriers under the return movement of the cradle-like rack.

The provision of the carriers $h^{14}\ h^{15}$ for temporarily holding and subsequently adding in the tens of the several denominations is a highly important one in relation to the other parts of the computing mechanism. It is desirable to move the whole series of primary counters $h'$ or more or less thereof either independently or collectively in the primary counting movement regardless of order and, nevertheless, be able to make a correct addition. The said tens-carriers $h^{14}\ h^{15}$ make this possible.

The relative arrangement of the dogs $h^6$ to the key-sectors and the counters $h'$ is also an important one, because thereby the key-sectors may be manipulated in any order—right to left, left to right, or part one way and part the other—at will in the assembling action, and any set dog $h^6$ may be reset at will for the correction of errors before the printing or counting takes place.

The joint provision of the dogs $h^6$ and the carriers $h^{14}\ h^{15}$ in their relations to the key-sectors and the counters $h'$ enable the collective movement of the counters $h'$ in the counting action and the collective return of the key-sectors at one and the same time.

This construction constitutes an important departure in computing mechanisms, avoiding a multiplicity of parts, which would otherwise be required for computing.

From the foregoing statements it will be seen that this mechanism computes by way of double or may be multiple addition, one collective addition being made for the units of all the denominations of the listed number on the primary counting movement of the counters $h'$ and one or more other additions being made to count or carry the tens, when the said counters $h'$ are subsequently moved in succession by the carriers $h^{14}\ h^{15}$. The action may be illustrated by the following examples:

```
 9987           999
 6543             1
 ----          ----
 5420 units.   990 units.
 1111 tens.      1 ten.
 -----         ----
16530 total.   900 units.
                 1 hundred.
               ----
               1000 total.
```

There may of course be as many subsequent or multiple additions for the tens as there are decimal orders less one. These successive additions, however, for the said tens are quickly made, as hitherto described, by the successive action of the staggered dogs $h^{24}$ on the carriers by the single return stroke of the main operating-lever $f^{24}$.

The total of the listed numbers being visible through the reading-slot might of course be listed by the direct action of the listing mechanism, as above described.

In practice we prefer to list the total number in the said direct manner for the sake of greater simplicity of the machine, and are enabled so to do when the modified form of counter-actuating dog (shown in Fig. 36) is employed, as will hereinafter be described.

In the machine shown in the main views, however, we have provided means for printing or listing the total number under the action of the counter-returning devices, which will now be described.

*Counter-returning or zero-setting devices.* (See Figs. 1, 3, 4, 5, 6, 17, and 23 to 35.)—The shaft $h$, on which the primary counters $h'$ are mounted, is provided with a series of circumferential grooves $p$, and with a single longitudinal groove $p'$ intersecting the circular grooves $p$, as best shown in Fig. 23. In the longitudinal groove $p'$ is loosely seated a bar $p^2$, which controls a series of gravity-dogs $p^3$, seated in the circular grooves $p$. The said bar $p^2$ and dogs $p^3$ are shown in Fig. 24 as pulled apart from the shaft $h$. (Shown in Fig. 23.) The actions of the said bar $p^2$ and the dogs $p^3$ are best shown in Figs. 25 to 35. The dogs $p^3$ have notches $p^4$, slightly larger in cross-section than the cross-section of the bar $p^2$, which notches $p^4$ engage loosely over said bar $p^2$, as shown best in Figs. 25 and 27. The longitudinal groove or seat $p'$ for the bar $p^2$ is also a little larger in cross-section than the said bar $p^2$. The left end of the bar $p^2$ extends outward beyond the end of the shaft $h$ in position to be engaged by a finger $p^5$ on the counter-returning lever or crank-handle $p^6$, as best shown in Figs. 30 to 35. The said return-lever $p^6$ fits the extended trunnion end of the shaft $h$ and connects thereto by a key and keyway $p^7\ p^8$, as best shown in Fig. 30.

The keyway $p^8$ is larger in cross-section than the key $p^7$, so as to permit the lever $p^6$ to have a limited idle motion on the shaft $h$ before turning the shaft therewith. The said return-lever $p^6$ is also provided with an arc-shaped slot $p^9$, which is engaged by a lateral stud or pin $p^{10}$, projecting from an adjacent part of the machine-bed $a$ and serving to limit the movement of the return-lever $p^6$ in both directions. The handle end of the return-lever $p^6$ is heavier than the finger end $p^5$ of said lever, and hence the handle portion tends to hold the finger portion $p^5$ in the position shown in Figs. 30, 31, 32, and 35. When in said position, the finger $p^5$ will engage the flat face of the projecting end of the bar $p^2$ and tend to hold the same, together with the dogs $p^3$, in the position best shown in Figs. 4 to 6 and in Figs. 25, 31, 32, and 35. When in this normal position just noted, the primary counters $h'$ may freely move on the shaft $h$ without interference from the return-dogs $p^3$. When, however, the return-lever $p^6$ is moved rearward, as shown in Figs. 33 and 34, it will first make its idle movement on the shaft and then move the shaft therewith. The said idle movement of the lever $p^6$ is sufficient to back the finger $p^5$ away from the bar $p^2$ into the position shown in Fig. 33. The said bar $p^2$ can then tilt with the dogs $p^3$, under the action of gravity, into the positions best shown in Figs. 26 and 27. The dogs $p^3$ will then sooner or later project beyond the peripheral edges of the circular grooves or seats $p$, so that the free ends of the same will come into the path of the inwardly-extended or spoke-like parts of the broad-faced teeth $h^2$ of the primary counters. Hence when the shaft $h$ moves with the lever $p^6$ the said dogs $p^3$ will engage with the primary counters $h'$ in succession or in whatever order they may stand and operate to collect the same altogether and return the same to their normal or starting position with the zero-notations on the reading-counters directly under the reading-slot $b^3$. By then reversing the movement of the return-lever $p^6$ it may be brought back to its normal position, as shown, for example, in Figs. 30, 31, and 32, so as to hold up the dogs $p^3$ out of the paths of the counters $h'$. Hence by the said counter-returning devices above described all the counters may be restored to their normal or starting position at will ready for use in tabulating a new list.

It has already been noted, and is obvious from an inspection of the drawings, that the counter-actuating dogs $h^6$ are so hung that the tips thereof normally engage with the teeth of the primary counters $h'$, but they may, however, be released either by hand, as when a key-sector is returned and reset by hand for the correction of an assembling error, or all the said dogs $h^6$ may be released collectively by a common hand releasing device $p^{11} p^{12}$, of bail-like form, pivoted on the shaft $c'$, as shown in Fig. 1 and operating as shown in Fig. 29$^a$.

At the end of the direct listing action for the individual numbers the counters will be in position to exhibit the total number through the reading-slot $b^3$, as hitherto noted. This position of the said parts is shown for an assumed number in Fig. 28. When the return-lever $p^6$ is then moved rearward to return the counters to their normal or starting position, the parts for the assumed case will be thrown from the position shown in Fig. 28 to the position shown in Fig. 29. Otherwise stated, the said counters $h'$ on their said return movement will become drivers for the dogs $h^6$, and will carry the same, together with the key-sectors, downward whatever number of steps the said counters may move on their return motion. This will necessarily have the effect of automatically bringing the proper type to the printing-line for listing or printing the total of the listed numbers, as may be verified by noting the quadrant notations and the positions of the parts in said Figs. 28 and 29. When the parts are in the position shown in Fig. 29, the counters will all be in their normal or starting position and the type ready to print the total, as before stated. Hence by manipulating the releasing device $p^{11} p^{12}$ the dogs $h^6$ may all be released from the counters and held in the position shown in Fig. 29$^a$, and while so held the listing or main operating-lever $f^{24}$ may be operated to print the total number and restore the sector-levers to their normal positions. The parts will then all be in their normal positions ready for use on a new list.

In the modification shown in Fig. 36 the counter-actuating dog $h^{36}$ is pivoted to its pivoted supporting-arm $h^5$ at the point $h^{37}$ and has a slot $h^{38}$ engaged by a pin $h^{39}$, which connects the sector-link $h^{11}$ to said arm $h^5$. With this construction the dog $h^{36}$ always stands, by gravity, in the position shown in Fig. 36, so that its tip is free from the counter $h'$; but, nevertheless, the said dog $h^{36}$ will be made by the bar $h^{19}$ of the cradle to engage and operate the counter in the same way as the form of dog $h^6$. (Shown in the principal views.) The advantage of the free dog (shown in Fig. 36) is that it never interferes with the return movement of the counters $h'$ and there is no possibility of moving the counters forward when restoring a sector by hand for the correction of an error.

When the free dog $h^{36}$ is employed, the counter-returning devices may also be simplified, requiring only the notched dogs $p^{13}$ and a loose rod $p^{14}$, arranged as shown in Fig. 36. The rear ends of the dogs $p^{13}$ are free to fall at any time when not upheld by the inward extension of one of the broad teeth $h^2$, but will not thereby interfere with the counting action of the counters $h'$, because the action of the counters on the dogs $p^{13}$ will lift the same with a cam-like action, so as to freely pass. When, however, the shaft $h$ is turned from the left toward the right, or in the same directions as the counters move when counting, the free ends of the dogs $p^{13}$ will engage with the counters and restore the same to their normal or starting position.

When the construction shown in Fig. 36 is employed, the total numbers are listed by the direct listing action in the same way as the other numbers. The total number can thus be listed as quickly or more quickly than it can be done automatically with the construction shown in the main views. In practice, therefore, we prefer to build a machine with the construction as shown in Fig. 36 instead of using the form of counter-actuating dog and the form of counter-returning devices shown in the main views, because of the greater simplicity and cheapness of construction. In this connection it may be noted that whether the counter-returning devices be in the form shown in the principal views or in the form shown in Fig. 36 they are held from falling out of their seats in the shaft $h$ by the fact that the inner ends of the broad-faced teeth $h^2$ of the counters $h'$ span the circumferential grooves $p$. This feature of construction also prevents the eccentric strap-like parts of the pivoted arms $h^5$ on the shaft $h$ from falling into the grooves $p$ of said shaft.

All the parts of the machine have now been specified, and the operation has been so fully stated, in connection with the detailed description, that it is not thought necessary to repeat the same at this point.

It will of course be understood that many of the details of the construction might be changed without departing from the spirit of our invention.

The great advantage of this machine is its comparative simplicity and cheapness of construction as compared with other machines, so far as known to us, for doing the same kind of work. The machine herein shown is capable of rapid action, admits of the ready correction of errors before the printing or counting is done, and counts up the listed numbers with absolute accuracy.

The direct manipulation of the combined key and type sector levers without requiring a separate keyboard for assembling the type, the collective movement of the primary counters in the counting action, and the collective or common return movement of the key-sectors greatly simplify the construction and thereby greatly reduce the cost of the machine.

Throughout the description it has been assumed that the key-sectors are manipulated by the fingers of the operator; but it must be obvious that, instead of the fingers, the operator may employ a pencil or other intermediate devices.

The field of use for such machines is of course so well known as not to require any extended notice. They are of service wherever it is desired to list and compute columns of figures. They are of a special value in banks and counting-rooms, not only for listing and computing checks and other items, but for proving hand-listing and mental reckoning.

It must be obvious that some parts of the machine herein shown and described are capable of independent use.

The type selecting and alining devices shown are, for example, capable of coöperation with the impression devices shown, or many others, as a type-writer for general work, by simply equipping the double-sector levers with complete alphabets of type and key-notations. Likewise the computing mechanism shown is capable of general use, whether operated by the listing mechanisms shown or in any of many other ways.

It will be readily understood that the impression devices shown and described might be substituted by other impression devices of many different forms for coöperation with the type selecting and alining devices in the printing or listing action.

What we claim, and desire to secure by Letters Patent of the United States, is as follows:

1. The combination with impression devices, of the series of double-sector combined type and key levers having the type and the key notations in reverse order, and provided with fingering-surfaces, and one or more dogs engageable with the key sector or sectors, under the fingering movement, to positively intercept and stop the said levers, as required for alining the desired type or stopping the said sectors in the desired position, substantially as described.

2. In a listing and computing machine, the combination with impression devices and a series of counters, of the series of double-sector combined type and key levers having the type and the key-notations in reverse order on the respective sectors, and provided with fingering-surfaces on the key-sectors, devices adapted to be set by the movement of said sector-levers for action on said counters, and one or more dogs engageable with the fingering-surfaces of the key-sectors, under the fingering movement, to positively intercept and stop the said levers, as required, for the purposes had in view, substantially as described.

3. The combination with impression devices, of the series of double-sector combined type and key levers, and a stop-board consisting of a series of movable dogs engageable with the sector-levers, under the fingering movement, to positively intercept the same, substantially as described.

4. The combination with impression devices, of the series of double-sector combined type and key levers, a stop-board consisting of a series of pivoted dogs engageable with the sector-levers, under the fingering movement, to positively intercept the same, and a corresponding series of pivoted finger-guards overlying said dogs, substantially as described.

5. The combination with impression devices, of the decimal-scale series of double-sector combined type and key levers, as described, and the corresponding series of pivoted stop-dogs overlapping from the higher to the lower orders, in the decimal scale, and operative on said sectors, as described, for automatically assembling the cipher-type under the fingering movement required for assembling the digit-type, substantially as described.

6. The combination with the sector-levers $c$ having type and key notations, arranged as described, of the lugs $c^{16}$ the cam-toes $c^{19}$ on the key-sectors and the pivoted stop-dogs $c^{17}$ with the lateral projections $c^{20}$, all arranged and operating, substantially as and for the purpose set forth.

7. The combination with type selecting and alining devices and a platen or printing device movable against the alined type to take the impression, of a knuckle or toggle lever, for moving said platen, composed of a pair of separated arms which meet and engage on passing the dead-centers only, substantially as and for the purpose set forth.

8. The combination with type selecting and alining devices, of a spring-held pivoted platen or printing-rocker, a gravity-action knuckle-arm pivoted to said platen, a hand-shaft and a rigid knuckle-arm carried by said shaft and engageable with said gravity-arm only while passing the dead-centers, so as to make the impression and effect the release, substantially as and for the purpose set forth.

9. The combination with the double-sector combined type and key lever $c$, as described, of the spring-held printing-rocker $f f'$ having the impression-roller $f^2$, the paper strip $f^4$ and feed devices for the same, inking devices for the assembled type, the hand-shaft $f^{23}$ with hand-lever $f^{24}$, the gravity knuckle-arm $f^{18}$ with lateral lug $f^{20}$ and the rigid knuckle-arm $f^{22}$ on said hand-shaft with notch $f^{21}$ engageable with said lug of said gravity-arm, substantially as described.

10. The combination with the printing-rocker $f f'$ having the spring-pawls $f^{13}$, of the ratchet feed-disks $f^{12}$ engaged by said pawls, the ribbon $f^{10}$, the spools $f^{11}$, the spindles $f^{14}$ common to said spools and feed-disks, and the clamping or tension devices $f^{15} f^{16}$, all arranged and operating substantially as described.

11. The combination with the double-sector levers $c$, of the spring-held printing-rocker $f f'$, the impression-roller $f^2$ and feed-roller $f^3$ on said rocker, the paper strip $f^4$ unwinding from spool $f^5$, the feed-roller ratchet $f^7$, the spring-pawl $f^8$, the inking-ribbon $f^{10}$ and its supporting devices $f^{11}$ to $f^{16}$, the hand-shaft $f^{23}$ with hand-lever $f^{24}$, the gravity-arm $f^{18}$ with stud $f^{20}$, and the arm $f^{22}$ with notch $f^{21}$ on the hand-shaft $f^{23}$, all arranged and operating substantially as described.

12. A computing mechanism, involving the combination of a decimal-scale series of primary counters capable of collective and independent actions, a corresponding series of carriers for the tens, adapted to be set, by said primary counters each in position to operate, later, on the primary counter of the next higher order, and a cradle-like rocking rack provided with a series of pivoted dogs staggered in the order of the decimal scale, and arranged to clear the carriers on the primary stroke of the rack, and to engage with the set members of said carriers, in succession, on the return movement of said rack, for carrying the tens, substantially as described.

13. The combination with the decimal-scale series of double-sector combined type and key levers, of the decimal-scale series of counters, and a corresponding series of counter-actuating dogs connected by links with said sector-levers, for movement to and from their set position, with said sectors, substantially as described.

14. The combination with impression devices, of a series of double-sector levers, a series of counters, a series of counter-actuating dogs connected by links with said sector-levers and adapted only to be set thereby, for collective action, later, on the counters, a dog-driver engageable with said dogs, when set, to collectively operate the counters and return the sector-levers to normal position, and, means for operating said impression devices and said dog-driver, in succession, substantially as described.

15. The combination with type-assembling devices, of a decimal-scale series of primary counters, capable of collective and independent actions, a corresponding series of dogs connected with said type-assembling devices for common movement therewith, and adapted to be set thereby for collective action later on said counters, and a corresponding series of carriers, for the tens, adapted to be set, in any order, by said primary counters, for action, later, on the primary counters, in succession, to carry the tens, substantially as described.

16. The combination with the counter-supporting shaft $h$, the counters $h'$ and the arms $h^5$ pivoted on said shaft, of the counter-actuating dogs pivoted to said arm, and having beveled heels and the movable bar or dog-driver $h^{19}$ with reversely-beveled edge, for action on said dogs, whereby the cam action of said beveled surfaces will lock the dogs to the counters and prevent the counters from throwing past their proper stopping position, substantially as described.

17. The combination with impression devices and type-assembling devices, of a series of primary counters, a series of counter-actuating dogs movable, one by each of said primary counters and adapted to be set, by said assembling devices, for collective action, later, on said counters, a series of tens-carriers adapted to be set, by said counters, for action thereon, later, to carry or add the tens, a reciprocating rack or body provided with a bar for collective action on said dogs and counters, under the primary stroke of said rack, and having a series of dogs, staggered in the order of the decimal scale, for action on said carriers, in succession, under the return stroke of the rack, to carry the tens, and means for operating said impression devices and reciprocating said rack, in the proper order, substantially as described.

18. The combination with impression devices, of the double-sector levers $c$, as described, the series of counters $h'$, the series of pivoted arms $h^5$, the series of counter-actuating dogs $h^6$ pivoted to the arms $h^5$ and connected by links $h^{11}$ with said sector-levers, the series of primary counters $h'$, the series of carriers $h^{14}$ $h^{15}$, the cradle with the common bar or dog-driver $h^{19}$, and provided with the staggered gravity-dogs $h^{24}$, the hand-shaft $f^{23}$ with hand-lever $h^{24}$, and connections from said shaft, for operating said impression devices and returning said cradle, in the proper order, all substantially as and for the purposes set forth.

19. The combination with impression devices, of the double-sector combined key and sector levers $c$, the series of counters $h$, the arms $h^5$ pivoted on the counter-shaft, the dogs $h^6$ pivoted to said arms $h^5$, normally engaging the counters but free to move over the same when being set by the sectors, counter-returning devices, and a common releasing device for said dogs $h^6$, whereby the return of said counters will assemble the proper type for printing the total, and said sector-levers may be returned to their normal position without moving the counters from their normal or starting position, substantially as described.

20. The combination with a decimal-scale series of counters, of a common shaft, supporting the same, having a corresponding series of circumferential grooves and provided with a longitudinal groove intersecting the circular grooves, a common bar or rod seated in said longitudinal groove, and a series of dogs seated in said circular grooves and hung on said bar, with said parts so arranged that the counters may freely turn on said shaft, in the counting movement and be engaged by said dogs, when said shaft is moved, for restoring the counters to their normal or starting position, substantially as described.

21. The combination with the shaft $h$ having the circular grooves $p$ and the longitudinal groove $p'$, of the counters $h'$ on said shaft having the broad teeth $h^2$, the inner radial arms of which span the said grooves $p$, the bar $p^2$ loosely seated in the groove $p'$, the dogs $p^3$ seated in said grooves $p$ and loosely hung on said bar $p^2$, a crank-handle $p^6$ for moving said shaft $h$ connected therewith, with freedom for a limited idle motion, and provided with a finger $p^5$, adapted to engage with the extended end of the bar $p^2$, for normally holding the dogs $p^3$ up out of the way of the counters, whereby, on the turn of the said shaft, the said counters may be restored to their normal position, substantially as described.

22. The combination with type-assembling devices operative in any order, of a corresponding series of primary counters, capable of both collective and independent actions, a corresponding series of counter-actuating dogs movable one by each of said type-assembling devices and thereby adapted to be set for subsequent collective action on said counters, and a corresponding series of independently-movable carriers for the tens, movable in any order one by each of said primary counters, and thereby adapted to be set for subsequent successive action on said primary counters, to carry the tens, substantially as described.

In testimony whereof we affix our signatures in presence of two witnesses.

HASTINGS H. JOHNSON.
CLARENCE O. WHITE.
MARSHALL B. LLOYD.

Witnesses:
  JAS. F. WILLIAMSON,
  E. F. ELMORE.